United States Patent [19]
Lindsey et al.

[11] 3,822,862
[45] July 9, 1974

[54] CONVENTIONAL CONDUCTOR STRINGING ASSEMBLY FOR POWER LINE USE

[75] Inventors: L. E. Lindsey, Pasadena; Herbert F. Sammons, Glendale, both of Calif.

[73] Assignee: Lindsey Manufacturing Company, Pasadena, Calif.

[22] Filed: June 2, 1972

[21] Appl. No.: 259,315

Related U.S. Application Data

[63] Continuation of Ser. No. 55,056, July 15, 1970, abandoned.

[52] U.S. Cl...... 254/196, 248/226 R, 254/134.3 PA
[51] Int. Cl............................................. B66d 1/36
[58] Field of Search........... 254/134.3 R, 134.3 PA, 254/192–196; 174/5 R, 5 SG, 6, 7, 168, 172; 248/214, 226, 231, 310

[56] References Cited
UNITED STATES PATENTS

| | | | |
|---|---|---|---|
| 2,312,084 | 2/1943 | Dyer | 254/134.3 PA X |
| 3,012,756 | 12/1961 | Cronkright | 254/134.3 PA |
| 3,235,228 | 2/1966 | Lindsey | 254/134.3 PA |
| 3,545,724 | 12/1970 | Wright | 254/134.3 PA |

*Primary Examiner*—Evon C. Blunk
*Assistant Examiner*—James L. Rowland
*Attorney, Agent, or Firm*—Sellers and Brace

[57] ABSTRACT

Convertible conductor stringing assembly for use when installing a power conductor along a power line and usable in a variety of modes to accommodate different conditions. The conductor handling sheave is usable selectively while supported either on the insulator itself or on an insulator support cross arm and, in either mounting mode, the sheave itself is pivotable from one of its several normal stringing positions to a position for transfer of the conductor directly into clamping position on the insulator. The assembly readily accommodates a range of both insulator cross arm sizes on either of which the pivoting sheave subassembly is securable in a number of positions.

32 Claims, 10 Drawing Figures

PATENTED JUL 9 1974 3,822,862
SHEET 1 OF 3
FIG. 1.
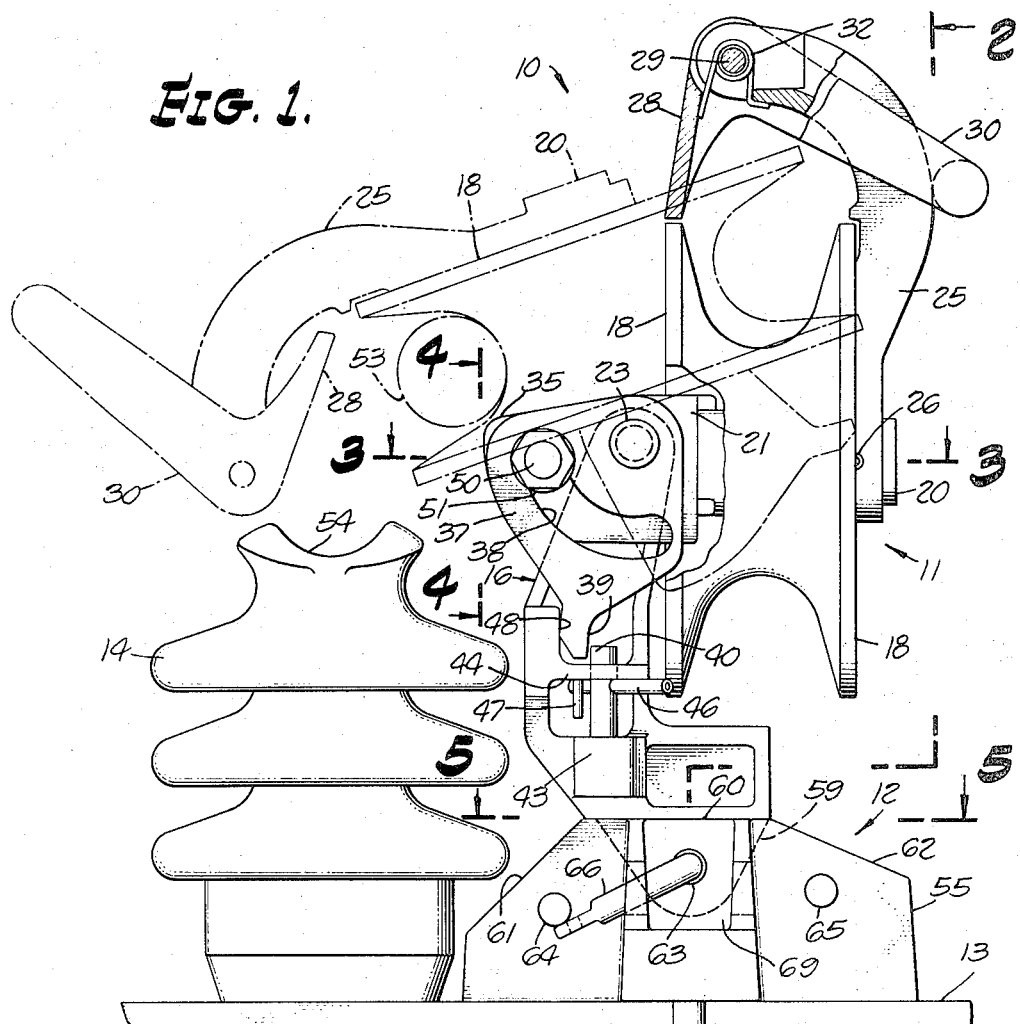
FIG. 3.
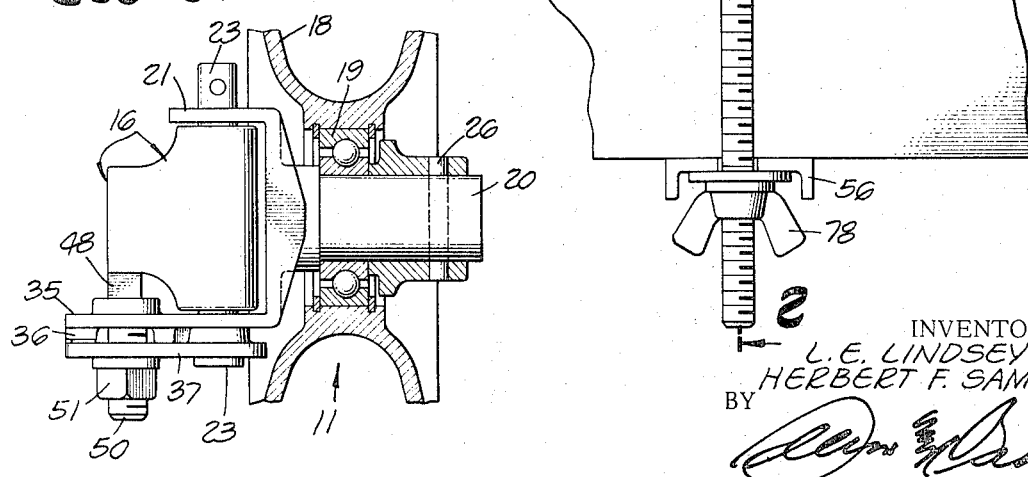
INVENTORS.
L.E. LINDSEY
HERBERT F. SAMMONS
BY
ATTORNEYS

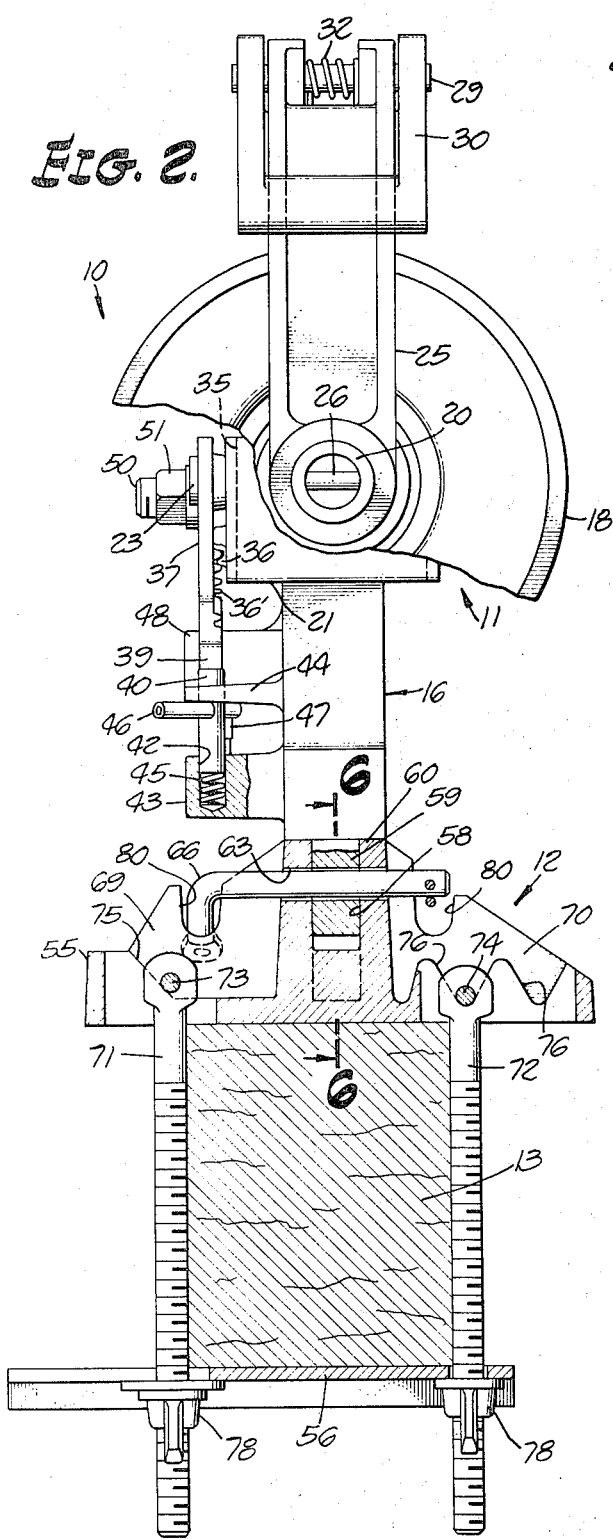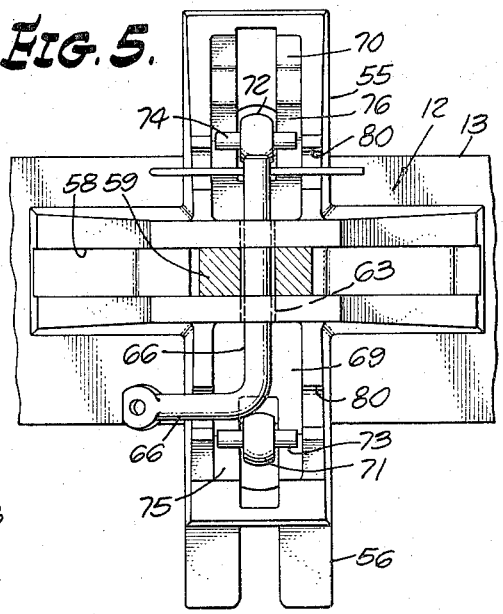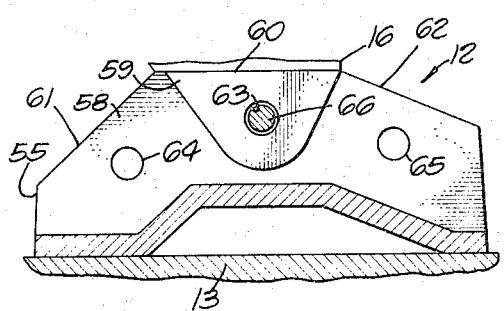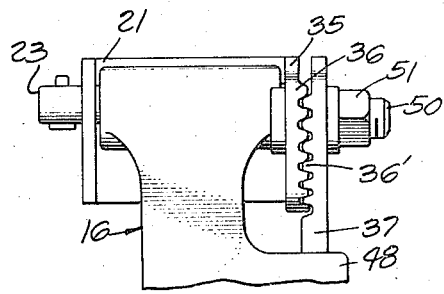

CONVENTIONAL CONDUCTOR STRINGING ASSEMBLY FOR POWER LINE USE

This application is a continuation of our application for U.S. Letters Patent, Ser. No. 55,056, filed July 15, 1970, which is now abandoned.

This invention relates to conductor stringing devices, and more particularly to a unique conductor stringing assembly readily convertible for use while secured directly to a power line insulator or alternatively while secured to a cross arm supporting the insulator.

Modern power line designs are undergoing rapid change owing to many factors including improvements in construction materials, new and greatly improved components, and the ability of equipment to handle ever higher voltages. These and the like factors introduce new problems as respects equipment employed to install conductors, and particularly as respects stringing accessories employed temporarily at each insulator while pulling the conductor into place along the power line and thereafter to transfer the conductor onto the insulator.

Owing to the great variety of modes of supporting the insulator and changes in the insulator sizes and designs, power companies have found that hardware purchased for use on one power line is quite unsuitable for use on a different line and under different conditions. For example, if the conductor stringing sheave of prior equipment is designed for support on the cross arm for a particular size insulator then it is quite unsuitable for use with an insulator of substantially different size. Alternatively if the prior stringing sheave is designed for use beside an upright insulator it is unusable to install a conductor on a horizontally supported insulator or on one inclined to the vertical.

In view of the foregoing and other numerous shortcomings of prior conductor stringing equipment, it is the purpose of the present invention to provide a unique and highly versatile convertible conductor stringing assembly usable in a great variety of ways in connection with insulators varying widely in diameter, height and relationship to the horizontal plane as well as on different size cross arms. To this end the invention construction comprises a sheave sub-assembly having a mounting shank selectively securable in a variety of positions in either of two types of supports, one of which is clampable about the body of the insulator itself, and the other of which is clampable to the insulator support cross arm. The sheave sub-assembly is provided with a multi-position hinging connection between the sheave proper and its supporting shank normally locked in a selected position. After the conductor has been hauled into its operating position the hinging connection is unlocked to permit lateral pivoting of the sheave to dump the conductor onto the insulator.

The stringing assembly is clampable with equal facility to an insulator supported horizontally, vertically or at any intermediate inclination. The alternate mounting clamp for the stringing sheave has simple but versatile means for rigidly clamping the same to a cross arm. This clamp is so designed that it is securable with equal rigidity to cross arms of widely varying size and tolerance variations, including both the vertical and horizontal thicknesses of the cross arms.

Accordingly it is a primary object of the present invention to provide a unique, convertible, conductor stringing assembly usable with equal effectiveness and efficiency while secured to a cross arm or to the body of the insulator proper.

Another object of the invention is the provision of a convertible conductor stringing assembly comprising an insulator clamping sub-assembly, a cross arm clamping sub-assembly and a sheave sub-assembly selectively usable with either of the aforesaid clamping sub-assemblies.

Another object of the invention is the provision of an improved conductor stringing sub-assembly having a sheave pivotally secured to one end of the mounting arm having its other end equipped with a mounting shank selectively securable in various positions on a support therefor.

Another object of the invention is the provision of a conductor stringing sub-assembly mountable beside an insulator with the plane of the sheave normal or at some selected inclination parallel to the insulator axis, and having its stringing sheave pivotable between a normal conductor stringing position and a second position convenient for the transfer of the conductor from the sheave onto the insulator.

Another object of the invention is the provision of novel support means for a conductor stringing sub-assembly which is clampable about the body of an insulator and usable to support the stringing sub-assembly in an upright stringing position either beside or normal to the insulator.

Another object of the invention is the provision of the mounting support for a conductor stringing sub-assembly which is clampable rigidly to an insulator cross arm irrespective of wide variations in the size and tolerances of the cross arm.

Another object of the invention is the provision of a supporting accessory for a conductor stringing assembly designed for automatically clamping the support against all four surfaces of a power line cross arm and for automatically accommodating the support to a particular cross arm size as the clamping bolts are tightened.

These and other more specific objects will appear upon reading the following specification and claims and upon considering in connection therewith the attached drawing to which they relate.

Referring now to the drawing in which a preferred embodiment of the invention is illustrated:

FIG. 1 is a vertical side view of the invention convertible conductor stringing assembly secured to a cross arm closely beside an upright insulator and including a dotted line showing of the sheave pivoted to a position to transfer the conductor onto an insulator;

FIG. 2 is a vertical cross sectional view taken generally along broken line 2—2 on FIG. 1;

FIG. 3 is a fragmentary cross sectional view taken generally along line 3—3 on FIG. 1;

FIG. 4 is a fragmentary view taken along line 4—4 on FIG. ;

FIG. 5 is a fragmentary view taken along line 5—5 on FIG. 1;

FIG. 6 is a fragmentary view taken along line 6—6 on FIG. 2;

Figure 7:
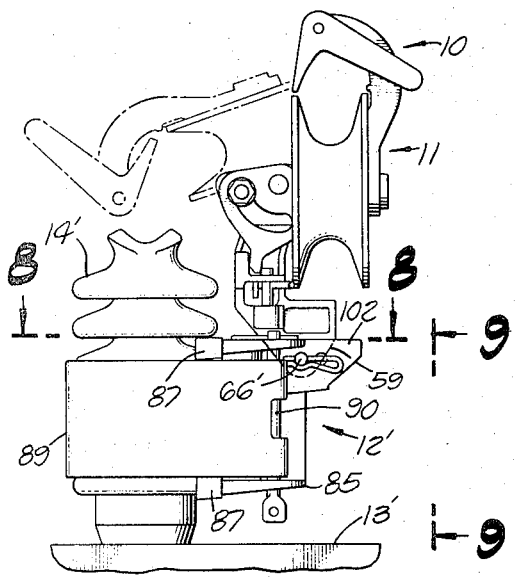
FIG. 7 is an elevational view generally similar to FIG. 1 but showing the stringing sub-assembly supported along the side of a longer upright insulator and employing a mounting band support encircling the body of the insulator.

Referring initially more particularly to FIGS. 1–6, there is shown an illustrative embodiment of the convertible stringing assembly, designated generally 10, comprising a sheave sub-assembly 11 rigidly clamped in a cross arm mounting sub-assembly 12. The latter sub-assembly 12 is shown secured to a typical cross arm 13 beside an upright insulator 14 mounted on the cross arm.

The sheave sub-assembly 11 has an elongated rigid main body 16 cast from suitable material such as high strength lightweight alloy. Deeply grooved sheave 18 is provided with anti-friction bearings 19 (FIG. 3) and is supported on a sub-shaft 20 having a bifurcated head 21 at one end hingedly connected by hinge pin 23 to the upper end of the main body 16.

Sheave 18 is secured in place on shaft 20 by a radial arm 25 held telescoped over the outer end of the shaft by a keeper pin 26. The upper curved end of arm 25 overlies the sheave groove and pivotally supports a keeper 28 by means of a pivot pin 29. Guard 28 is generally L-shaped and its longer leg 30 is provided with a large opening to receive the upper end of arm 25. The conductor guard is held normally in the position shown in FIG. 1 by a torsion spring 32, the outer transverse end of its leg 30 engaging the outer edge of arm 25. Further clockwise rotation of the guard is therefore prevented and the conductor seated on the sheave is held positively captive until the guard is manually rotated counterclockwise to the position indicated in dot and dash lines in FIG. 1.

Referring now more particularly to FIGS. 1–4, the means for selectively locking sheave 18 in a desired angular position relative to its main supporting body 16 will be described. One arm 35 of the bifurcated end 21 of the sheave supporting shaft is longer than the other as is best shown in FIG. 3 and its exterior surface is provided with an arcuate row of teeth 36 which interlock with teeth 36' on the adjacent face of a sector 37 fixed to the hinge pin 23. This sector is provided with an arcuate slot 38 desirably having a length of at least 90°. Protruding downwardly from the periphery of sector 37 is a locking lug 39 rotatable past the end of a latching pin 40 (FIGS. 1, 2). Latching pin 40 is supported for axial reciprocation within a well 42 of a boss 43 integral with main body 16, and an opening through a second boss 44 of the main casting and is normally urged to its latching position by a compression spring 45 housed in well 42. An operating handle 46 for the latch pin is normally held against the underside of boss 44 by spring 45. The inner end of handle 46 protrudes into the path of a stop pin 47 anchored in boss 44 as is evident from FIG. 1. A lug 48 cooperates with the upper end of latch 40 to hold locking lug 39 normally captive in the position shown in FIG. 1. However, when the latch pin 40 is depressed it will be evident that lug 39 together with sector 37 and sheave 18 are free to rotate clockwise about the axis of hinge pin 23.

Normally sector 37 is held locked in a desired adjusted position relative to arm 35 of shaft 20 by means of a threaded shank 50 (FIG. 3). This shank is fixed to arm 35 and protrudes through arcuate slot 38. When a lock nut 51 carried by shank 50 is loosened, sector 37 and pin 23 can be shifted outwardly to disengage teeth 36,36', thereby permitting sector 37 to be rotated through a limited arc relative to teeth 36. This permits detent 39 to be repositioned relative to the latch pin 40 to lock sheave 18 in a desired different stringing plane. When so adjusted lock nut 51 is tightened to lock teeth 36,36' in the new position. As shown in FIG. 1, the parts are locked together to support the sheave in a vertical plane while stringing the conductor. Under other operating conditions it might be desirable that the sheave be supported in a plane inclined to the vertical either to the right or to the left of the position shown in FIG. 1. Once the latch pin 40 is depressed however, the sheave and its supporting shaft 20 are free for rotated counterclockwise pivoting, such as to the position shown in FIG. 1 with the conductor 53 properly positioned for transfer into the seating groove 54 or a suitable clamping device carried at the top of insulator 14.

CROSS ARM MOUNTING SUB-ASSEMBLY

The cross arm mounting accessory 12 for the sheave will now be described with particular reference to FIGS. 1, 2, 5 and 6. This sub-assembly includes an upper generally cross-shaped casting 55 and a lower channel-shaped clamping member 56.

The arm of plate 55 extending lengthwise of the cross arm is formed with a deep slot 58 opening upwardly and through its opposite ends and having a snug sliding fit with the triangular shaped flat mounting shank 59 projecting from the lower end of the main body 16 of the sheave sub-assembly. The upper rim edges of slot 58 are contoured as is best shown in FIG. 6 and include a horizontal seating surface 60, a left hand seating surface 61 inclined at 45° to the horizontal and a right hand seating surface 62 inclined at 30° to the horizontal. The side walls of slot 58 are provided with three sets of aligned openings 63,64,65 similarly located relative to the associated surfaces 60,61,62 and receptive of a locking pin 66 to lock the sheave sub-assembly seated against any selected set of seating surfaces 60,61,62 and in different angular positions relative to cross arm 13. For example, when the sheave main body is locked assembled in the position shown in FIG. 1, main body 16 lies generally in an upright plane, whereas it if is locked against surface 61 it is inclined at an angle of 45° to the cross arm and if it is locked against surface 62 then it is inclined at an angle of 60° to the cross arm.

The other arm of mounting plate 55 extends crosswise of the cross arm and is provided with shouldered slots 69,70 to seat the headed end of the similar clamping bolts 71,72. The headed ends of these bolts are provided with cross pins 73,74 fixed to the respective bolts and best shown in FIG. 2. The ends of cross pins 73 engage the inclined camming surfaces 75 along either side of slot 69 and which serve to cam bolt 71 against the left hand side of cross arm 13 as viewed in FIG. 2 as these bolts are tightened.

Similar camming surfaces on either side of slot 70 cooperate to form V-shaped notches 76 and cooperate with pin 74 on bolt 72 for a similar purpose as that just described. As will be evident, pin 74 may be located in the trough of the notches or at some position along the side walls of these nothces at the start of a tightening operation on the thumb nuts 78 provided for each bolt. If the cross arm is a very narrow one cross pin 74 will be seated in the innermost one of the notches whereas if it is of wider construction then it would be seated in one of the other notches as is appropriate. Any further adjusting action required will be provided by the inclined camming surfaces 75 in notches 69 seating bolt 71.

It is also to be noted from FIG. 2 that each sidewall of slots 69 and 70 is deeply notched at 80 to seat the outer handle end of the locking pin 66 utilized to lock the sheave subassembly to the upper clamping plate. Accordingly, whenever this pin is in its assembled position it is held against disassembly by gravity rotation of its shorter leg into the adjacent one of notches 80.

INSULATOR SUPPORTED CLAMPING SUBASSEMBLY

Figure 9:
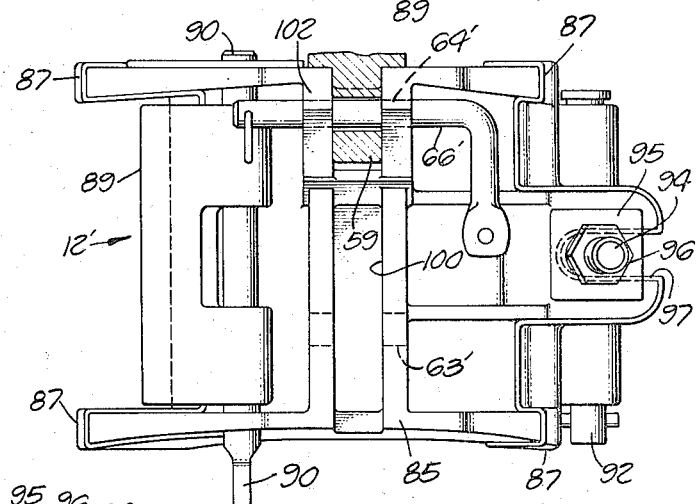
FIG. 9 is a fragmentary view on an enlarged scale and partly in cross section taken along line 9—9 on FIG. 7.
Figure 8:
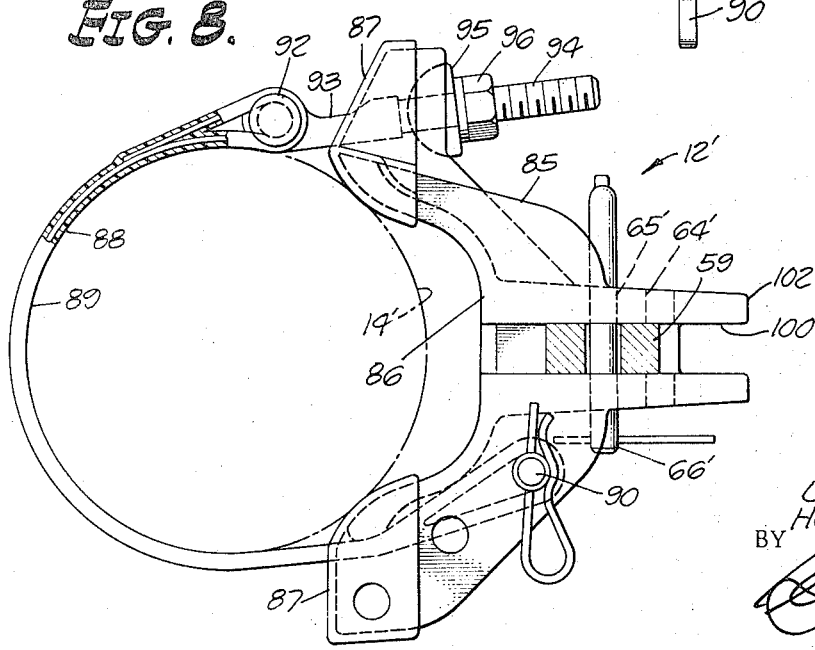
FIG. 8 is a cross sectional view on an enlarged scale taken along line 8—8 on FIG. 7.

Referring now to FIGS. 7–9, there is shown an alternate mounting sub-assembly 12' for supporting sheave sub-assembly 11 against the side of a rigidly supported insulator 14'. In FIG. 7, the insulator 14' is mounted in an upright position on a cross arm 13', whereas in FIG. 10 it is mounted and supported horizontally on the outer end of a pole supported bracket 13''. Mounting sub-assembly 12' comprises a cast main body 85 having a deep groove 86 shaped to embrace any of a wide range of insulator diameters. Its opposite longitudinal edges are preferably capped with thick elastomeric material 87 which seats against the exterior of the insulator and avoids overstressing or damaging the insulator.

Main body 85 is held rigidly clamped in any desired position lengthwise of the insulator by a wide flexible clamping band 88 preferably heavily coated with elastomeric material 89. The opposite ends of the clamping band are looped and one end seats over an anchor pin 90 and the other end is similarly attached to a pin 92 carried crosswise of the head of bolt 93. The threaded shank 94 of this bolt passes through an opening in one rim edge of main body 85 and supports a semi-cylindrical shaped washer 95 beneath a clamping nut 96. Tightening nut 96 locks the mounting sub-assembly 12' rigidly to the insulator. Preferably, the opening accommodating bolt 93 opens laterally through the edge of the main body as is indicated at 97 in FIG. 9, thereby facilitating the assembly and dis-assembly of unit 12 to an insulator.

Figure 10:
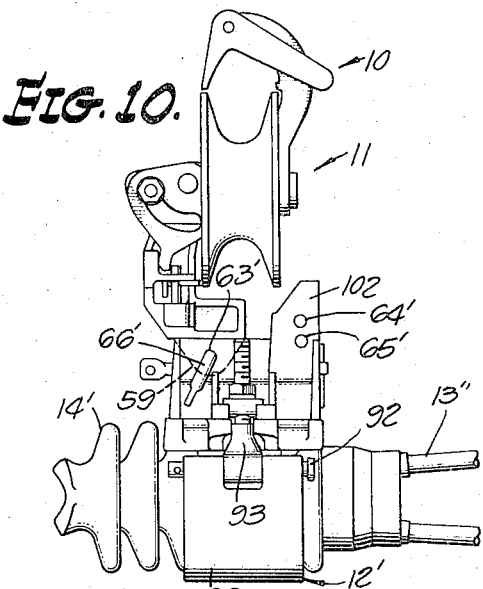
FIG. 10 is a view similar to FIG. 7 but showing the stringing assembly in its normal operating position when clamped to the body of the horizontally supported insulator.

Extending lengthwise of the exterior side of main body 85 is a deep slot 100 (FIG. 8) to receive mounting shank 59 of the main body of the sheave unit. Slot 100 is generally L-shaped and includes a longer leg extending lengthwise of main body 85 and a shorter leg 102 (FIGS. 7, 10) projecting generally radially relative to the clamping band 88. Each of these legs is provided with mounting holes 63',64',65' corresponding to holes 63,64,65 (FIG. 6) in which the assembly pin 66' can be seated to lock shank 59 assembled to its mounting clamp 12'. FIGS. 7 and 10 show but two of the several possible modes of securing sheave sub-assembly 11 to the flexible band-type mounting unit 12'.

While the particular convertible conductor stringing assembly for power line use herein shown and disclosed in detail is fully capable of attaining the objects and providing the advantages hereinbefore stated, it is to be understood that it is merely illustrative of the presently preferred embodiment of the invention, and that no limitations are intended to the details of construction or design herein shown other than as defined in the appended claims.

We claim:

1. A convertible stringing assembly for installing power conductors on insulators of a power line, said assembly having an elongated main body formed with a mounting shank on one end portion thereof which mounting shank is selectively anchorable in first and second supports, said first support being releasably clampable about the mid-body portion of an installed rigidly supported insulator and including means for supporting the main body of said stringing assembly closely along one side of the insulator, said second support being releasably clampable to an insulator supporting cross arm, means for quickly detachably anchoring said mounting shank to either of said selectively usable supports therefor, and cable support sheave means mounted on the end portion of said main body remote from said mounting shank and bodily tiltable relative thereto while supported in either of said first and second supports to facilitate transfer of a conductor directly from said sheave means onto an insulator-supported conductor clamping means.

2. A convertible stringing assembly as defined in claim 1 characterized in the provision of rigid means fixed to said main body and embracing the periphery of said sheave to hold a conductor captive on said sheave.

3. A convertible stringing assembly as defined in claim 2 characterized in that said means for holding a conductor captive on said sheave includes a manually releasable guard dog movable to a position wherein a conductor is free for transfer laterally across one rim edge of said sheave.

4. A stringing assembly as defined in claim 1 characterized in the provision of a hinging connection between said sheave means and said main body operable to permit pivotal movement of said sheave means through a limited arc about the axis of said hinging connection and including a position conveniently located for the safe transfer of a conductor from said sheave into a supporting seat for the conductor on an insulator supported therebeside.

5. A stringing assembly as defined in claim 4 characterized in the provision of manually operable means carried in part by said sheave and in part by said main body for locking said sheave means against hinging movement.

6. A stringing assembly as defined in claim 5 characterized in that said manually operable locking means includes separate means for locking said sheave means in any one of a plurality of operating positions each corresponding to a different angular position of said sheave relative to a vertical plane passing through the axis of said hinging connection.

7. A stringing assembly as defined in claim 1 characterized in that said support releasably clampable about an insulator includes an arcuate wide clamping band including means for clamping the same firmly about the exterior of an insulator, and socket means secured to said clamping band mateable with the shank of said main body and including means for securing said shank detachably but rigidly to said socket means.

8. A stringing assembly as defined in claim 7 characterized in that said socket means and said shank are formed for rigid securement together in any one of a plurality of normal conductor stringing positions, and said manually operable locking means then being releasable for hinging of said sheave means into conductor dumping position without disturbing the selected rigid connection between said shank and said socket means.

9. A stringing assembly as defined in claim 7 characterized in that said socket means includes an elongated open-ended slot, said slot having means for locking said shank in any one of a plurality of positions therein.

10. A stringing assembly as defined in claim 9 characterized in that said shank and the main body carried thereby is securable in said socket selectively in a first position normal to the axis of said clamping band depending on whether the insulator used to support said stringing assembly is mounted horizontally or vertically.

11. A stringing assembly as defined in claim 7 characterized in that said side clamping band includes a thick layer of semi-soft non-metallic material on the side thereof facing the insulator to enhance the gripping action thereof with an insulator and to avoid chipping and damage to the insulator surface.

12. A stringing assembly as defined in claim 4 characterized in that the pivot axis of said hinging connection lies in a plane normal to and beyond the outer free end of the power conductor seat on an insulator.

13. A stringing assembly as defined in claim 12 characterized in that said sheave means is pivotable to a conductor dumping position wherein the plane of the sheave is inclined downwardly to facilitate the gravity transfer of a conductor from the sheave into the support seat therefor on the insulator.

14. A stringing assembly as defined in claim 4 characterized in that said hinging connection includes a stub shaft rotatably supporting said sheave, said stub shaft having a bracket integral with one end, and pivot pin means pivotally connecting said bracket crosswise of one end of the main body of said stringing assembly.

15. A stringing assembly as defined in claim 14 characterized in the provision of a bracket arm fixed to the outer end of said shaft and extending radially therefrom and oppositely from said main body, and pivoting conductor guard means mounted on the outer end of said bracket arm cooperating with the latter to hold a conductor captive on said sheave and being pivotable to a position to permit transfer of the conductor laterally across the rim of the sheave.

16. A stringing assembly as defined in claim 14 characterized in that said main body is normally adapted to lie between an insulator and the conductor supporting sheave, and said bracket arm being positioned along the face of the sheave remote from said main body.

17. A stringing assembly as defined in claim 16 characterized in that said hinging connection lies in a plane outwardly beyond but close to the outer free end of the insulator.

18. A stringing assembly as defined in claim 1 characterized in the provision of stub shaft means for said sheave having one end thereof secured to the end of said main body remote from said mounting shank, a bracket arm secured to the other end of said stub shaft and extending radially therefrom along the face of the sheave remote from said main body, and conductor guard means pivotally mounted on the outer end of said bracket arm and cooperating with the latter to embrace the periphery of said sheave to hold a conductor releasably captive on the sheave.

19. A stringing assembly as defined in claim 18 characterized in the provision of a hinging connection between said stub shaft and said main body extending transversely thereof and normal to the longitudinal axis of said main body.

20. A stringing assembly as defined in claim 18 characterized in that said conductor guard means is generally L-shaped with a large opening through one leg thereof, the outer end of said bracket arm extending into said opening for pivotal connection therewith, said one leg serving as an operating handle for said guard means and the other leg thereof normally cooperating with one rim of said sheave to prevent the escape of a conductor from the sheave.

21. A stringing assembly as defined in claim 1 characterized in that said second support for said assembly includes socket means for said mounting shank and means for clamping said second support to a power line cross arm beside an insulator to which a conductor is to be transferred and secured after being hauled into position across the top side of the cross arm, and means for securing said mounting shank temporarily to said socket means.

22. A stringing assembly as defined in claim 21 characterized in that said shank is adapted to be inserted in said socket in either of two positions 180° apart relative to the longitudinal axis of said shank and said sheave means being adapted to pivot clockwise from a vertical plane in one of said positions and to pivot counterclockwise in the other of said positions.

23. A stringing assembly as defined in claim 21 characterized in that said second support includes upper and lower brackets adapted to be clamped against the upper and lower faces of a cross arm, said upper bracket including said socket means for said mounting shank, a pair of bolts interconnecting said upper and lower brackets along the opposite lateral sides of the cross arm and including cooperating means on said bolts and on said brackets utilizing the tensile stresses acting on said bolts during tightening to effect shift of the same toward one another and against the lateral faces of the cross arm.

24. A stringing assembly as defined in claim 23 characterized in that said upper and lower brackets are slotted to receive said bolts and to permit the same to shift bodily toward and away from one another to facilitate the rigid securement and detachment of said second support to and from a cross arm.

25. A stringing assembly as defined in claim 24 characterized in that certain of said slots include cam surfaces along the sides thereof inclined to the vertical and cooperable with radial projections from the adjacent ends of said bolts to cam the latter toward the lateral sides of the cross arms as said bolts are tightened.

26. A stringing assembly as defined in claim 25 characterized in that one of the bolt seating slots in said upper bracket has upwardly opening notches along at least one side selectively usable to seat the head of one of said bolts thereby to accommodate said second support to cross arms of different horizontal widths.

27. A stringing assembly as defined in claim 26 characterized in that said upwardly opening notches have downwardly converging walls effective to cam the associated bolt toward the sidewall of the cross arm as the bolts are tightened.

28. A stringing block as defined in claim 21 characterized in that said socket means comprises an upwardly opening horizontally elongated slot snugly seating said mounting shank, means for securing said mounting shank in different portions of said slot with the longitudinal axis of said main body inclined at different angles to a horizontal plane, flange means extending laterally from either side of said slot means having upwardly opening notches extending transversely thereof, and L-shaped assembly pin means for locking said mounting shank to said slot with the other leg of said L-shaped pin means rotated to seat in a selected one of said notches.

29. A conductor stringing sub-assembly adapted for use selectively while supported on and laterally along one side of an insulator and on a cross arm to one side of an insulator, said sub-assembly comprising an elongated rigid main body having a mounting bracket rigidly fixed to one end thereof, said mounting bracket including means for releasably and quickly locking the same to support means therefor secured either to an insulator or to a cross arm, a deeply grooved conductor seating sheave, a shaft assembled through the center of said sheave having one end pivotally secured to said main body for limited pivotal movement about a fixed axis extending crosswise of said one end to facilitate transfer of a conductor from said sheave onto the end of an insulator, and means for locking said shaft and main body against relative pivotal movement.

30. A stringing sub-assembly as defined in claim 29 characterized in that said main body is adapted to be supported rigidly in an upright position selectively along one side of either an upright insulator or one lying at any angle to the vertical.

31. A stringing sub-assembly as defined in claim 30 characterized in that said locking means is adjustable to lock said main body in any desired plane relative to the horizontal while in use to support a conductor while being hauled into position along a power line and thereafter being releasable to permit said sheave and its supporting shaft to be pivoted to facilitate transfer of the conductor on to the insulator.

32. A stringing sub-assembly as defined in claim 29 characterized in that said mounting shank is non-circular in cross section and adapted to have a snug fit in a complementally shaped seating recess therefor in a mounting support for said sub-assembly.

* * * * *